(No Model.)
J. N. BROWN.
ADJUSTABLE POLE COUPLING FOR VEHICLES.
No. 346,144. Patented July 27, 1886.
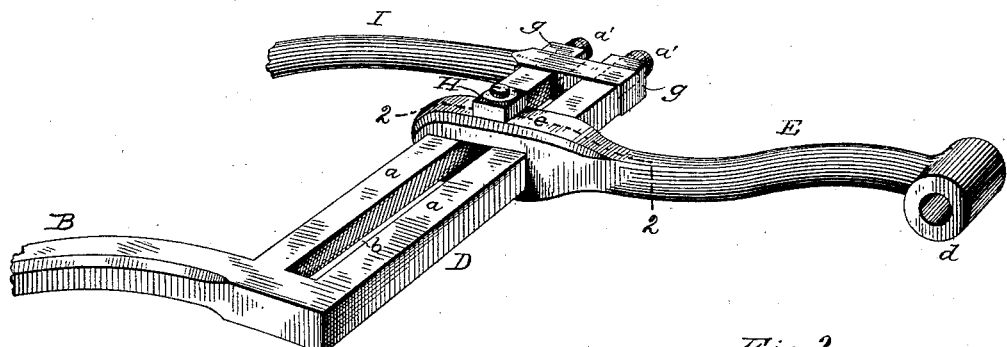
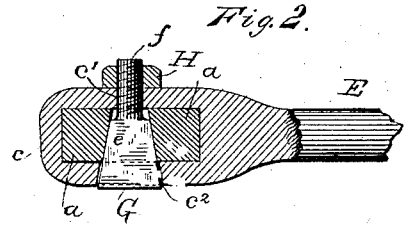
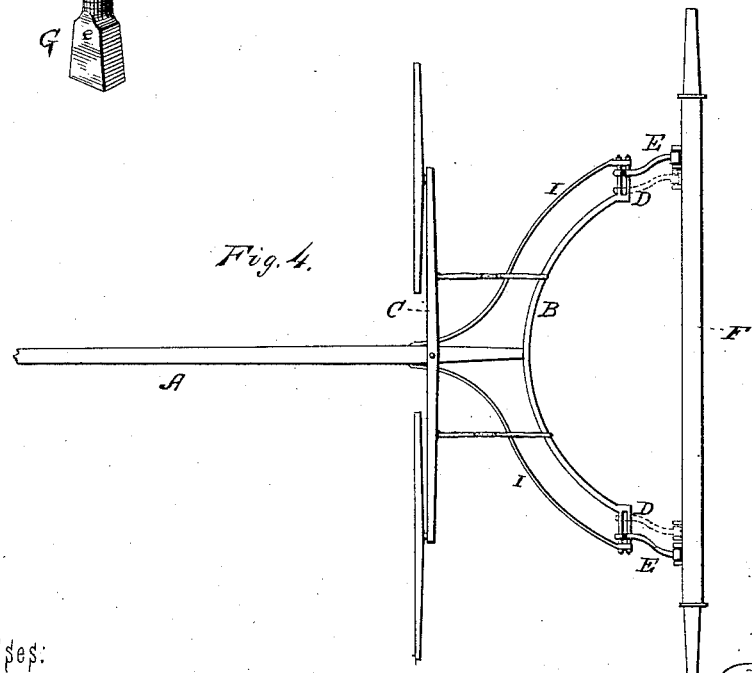
Witnesses:
Harry King
N. L. Collamer
Inventor:
John N. Brown
by J. C. Somes
Attorney.

UNITED STATES PATENT OFFICE.

JOHN N. BROWN, OF NEW LONDON, CONNECTICUT.

ADJUSTABLE POLE-COUPLING FOR VEHICLES.

SPECIFICATION forming part of Letters Patent No. 346,144, dated July 27, 1886.

Application filed October 6, 1885. Serial No. 179,150. (No model.)

*To all whom it may concern:*

Be it known that I, JOHN N. BROWN, a citizen of the United States, residing at New London, in the county of New London and State of Connecticut, have invented certain new and useful Improvements in Adjustable Pole Couplings for Vehicles, of which the following is a specification, reference being had therein to the accompanying drawings.

This invention relates to adjustable pole-couplings for vehicles, by means of which the pole may be readily fitted to vehicles of different sizes.

The object of this invention is to provide a coupling of this character which will be firm against lateral play, and which may be tightened, so as to compensate for wear and prevent rattling.

Figure 1 of the accompanying drawings is a perspective view of this improved pole-coupling. Fig. 2 is a section on line 2 2 of Fig. 1. Fig. 3 is a perspective view of the wedge-bolt constituting a part of this improved pole-coupling. Fig. 4 is a plan of a carriage-pole connected to the axle by this improved pole-coupling.

Similar letters of reference indicate corresponding parts in the different figures.

The pole proper, A, is attached at its inner end to a bow-shaped bar, B, and provided with a double-tree, C, of ordinary construction. The bar B has at its ends two outwardly-projecting forks, D, parallel with the axle. Each fork comprises two tines, $a$, which are angular in cross-section, and beveled on their inner opposite faces, forming an elongated transversely-wedge-shaped slot, $b$, between them. The outer ends, $a'$, of the tines $a$ are reduced, rounded, and screw-threaded.

Coupling-links E connect the pole with the axle F. Each of these coupling-links has a rectangular eye, $c$, at one end, adapted to fit over one of the forks D, and a round eye, $d$, at the opposite end for the pin of the axle-clip. The shell of the eye $c$ has a round hole, $c'$, through its upper or lower face, and a rectangular slot, $c^2$, through its opposite face, the opposite sides of said rectangular slot being beveled to correspond with the beveled inner sides of the tines $a$.

Bolts G and nuts H serve to unite the coupling-links E with the forks D. Each of these bolts comprises a wedge-shaped head, $e$, and a reduced screw-threaded shank, $f$. The shank passes through the hole $c'$ of the eye $c$, and the wedge-shaped head fits the rectangular slot $c^2$ in said eye and the wedge-shaped slot $b$ between the tines $a$.

Curved braces I are connected at their front ends to the pole proper, A, and at their rear ends to the forks D D of the bar B, being provided at said rear ends with holes, through which the reduced screw-threaded ends $a'$ of the tines $a$ are passed. Nuts $g$ on said ends $a'$ hold said braces on said forks.

The operation of connecting the pole with the axle by means of this coupling is as follows: Supposing all the parts are disconnected, the eyes $c$ of the coupling-links E are passed over the forks D of the bar B, and adjusted on said forks at the proper distance apart to bring the eyes $d$ of said links opposite the clips or cheeks of the axle to which the pole is to be attached. The bolts G are then passed through the slots $c^2$ and hole $c'$ of said eyes $c$, and between the tines $a$, the screw-threaded shank $f$ projecting beyond the shell of the eye on one side thereof, and the wedge-shaped head $e$ being flush, or nearly so, with the shell of the eye on the opposite side thereof. The nuts H are then screwed onto the projecting shanks $f$ and turned down tight against the shells of the eyes $c$, whereby the bolts G are drawn into the slots $b$, their wedge-shaped sides being firmly pressed against the inclined faces of the tines $a$, whereby the latter are spread apart slightly and caused to bind firmly in the eyes of the coupling links or shackles and in the braces. The coupling-links are thus rigidly connected with the pole in such manner as to avoid lateral play of the parts or rattling thereof. This connection makes a very strong shifting pole.

When the couplings require to be adjusted to suit another vehicle, the nuts H and bolts G are loosened and the coupling-links E moved nearer together or farther apart along the forks D.

I claim as my invention—

1. The combination, with a carriage-pole having transverse rear bars provided with lateral slots open at their outer ends, of coupling-links and wedge-bolts adapted to pass through said links and slots for clamping said bars and links together, substantially as described.

2. The combination, with a carriage-pole, A, having laterally-projecting parallel tines $a\ a$, provided with beveled opposite faces, of coupling-links E, having eyes adapted to be passed over and to embrace said tines $a\ a$, bolts G, passing through the shells of the eyes and between said tines, said bolts being wedge-shaped to fit the beveled faces of the tines, and nuts for drawing said bolts into position, substantially as described.

3. The combination, with a carriage-pole having laterally-projecting parallel arms or tines provided with beveled opposite faces, and screw-threads on their outer ends, of coupling-links having eyes adapted to be passed over and to embrace said tines, bolts passing through the shells of the eyes and between said tines, said bolts being wedge-shaped to fit the beveled faces of the tines, nuts for drawing said bolts into position, removable braces extending from the outer ends of said tines to the pole proper, and nuts screwed onto said outer ends over said braces, substantially as described.

4. The combination, with a carriage-pole, A, having laterally-projecting parallel tines $a\ a$, provided with beveled opposite interior faces, of coupling-links E, having eyes adapted to be passed over and to embrace said tines $a\ a$, the shells of said eyes being provided with circular apertures through one side, and with wedge-shaped apertures through the other side directly opposite thereto, bolts G, passing through said apertures in the eyes and between the tines, said bolts having a screw-threaded end adapted to pass through said circular aperture, and a wedge-shaped end adapted to fit between the beveled faces of said tines and within said wedge-shaped aperture, and nuts for drawing said bolts into position, substantially as described.

JOHN N. BROWN.

Witnesses:
ORLANDO C. GORTON,
DANIEL LEE.